US010373353B2

(12) United States Patent
Chiocco et al.

(10) Patent No.: US 10,373,353 B2
(45) Date of Patent: Aug. 6, 2019

(54) CROP YIELD DATA ADJUSTMENTS

(71) Applicant: Trimble Inc., Sunnyvale, CA (US)

(72) Inventors: Gregory D. Chiocco, Sunnyvale, CA (US); Eric A. Wuestefeld, Westminster, CO (US)

(73) Assignee: Trimble Inc., Sunnyvale, CA (US)

( * ) Notice: Subject to any disclaimer, the term of this patent is extended or adjusted under 35 U.S.C. 154(b) by 844 days.

(21) Appl. No.: 14/068,644

(22) Filed: Oct. 31, 2013

(65) Prior Publication Data

US 2015/0116330 A1 Apr. 30, 2015

(51) Int. Cl.
*G06T 11/20* (2006.01)
*G06Q 10/00* (2012.01)
*G06Q 50/02* (2012.01)

(52) U.S. Cl.
CPC .......... *G06T 11/206* (2013.01); *G06Q 10/00* (2013.01); *G06Q 50/02* (2013.01)

(58) Field of Classification Search
CPC ....... G06Q 50/02; G06Q 10/00; G06T 11/206
USPC ............................................. 73/861; 702/179
See application file for complete search history.

(56) References Cited

U.S. PATENT DOCUMENTS

| | | | | |
|---|---|---|---|---|
| 5,343,761 A * | 9/1994 | Myers | ..................... | A01C 7/105 73/861 |
| 5,666,793 A * | 9/1997 | Bottinger | ............. | A01B 79/005 460/1 |
| 5,902,343 A * | 5/1999 | Hale | ..................... | A01B 79/005 342/357.52 |
| 5,938,709 A * | 8/1999 | Hale | ..................... | G01C 21/20 342/357.52 |
| 6,150,617 A * | 11/2000 | Hart | ..................... | A01B 79/005 177/136 |
| 6,386,128 B1 * | 5/2002 | Svoboda | ............. | A01B 79/005 111/200 |
| 6,651,005 B2 * | 11/2003 | O'Neall | ............... | A01D 41/127 701/50 |
| 6,751,515 B2 * | 6/2004 | Moore | ................. | A01D 41/127 56/10.2 C |
| 9,668,420 B2 * | 6/2017 | Anderson | ............. | A01D 75/00 |
| 9,686,913 B2 * | 6/2017 | Foster | ................. | A01D 46/084 |
| 2004/0194442 A1 * | 10/2004 | Maertens | ............ | A01D 41/127 56/10.2 R |
| 2005/0066738 A1 * | 3/2005 | Moore | ................. | A01D 41/127 73/760 |
| 2006/0271262 A1 * | 11/2006 | McLain, III | ......... | A01B 79/005 701/50 |
| 2007/0050116 A1 * | 3/2007 | Jernigan | ............. | A01D 46/243 701/50 |
| 2012/0200697 A1 * | 8/2012 | Wuestefeld | .............. | G01F 1/00 348/137 |

(Continued)

OTHER PUBLICATIONS

Ping, et. al., Processing of Yield Map Data, Precision Agriculture, 2005, 6, pp. 193-212.*

(Continued)

*Primary Examiner* — Alexander Satanovsky
*Assistant Examiner* — Lina M Cordero
(74) *Attorney, Agent, or Firm* — Kilpatrick Townsend & Stockton LLP

(57) ABSTRACT

Yield monitors on harvesters engaged in multi-harvester crop harvesting are often calibrated inconsistently. Systems and methods for manually or automatically adjusting multi-harvester yield data are presented.

4 Claims, 11 Drawing Sheets

(56) References Cited

U.S. PATENT DOCUMENTS

| | | | | |
|---|---|---|---|---|
| 2014/0230580 A1* | 8/2014 | Dybro | ............... | A01D 45/021 73/865 |
| 2014/0236381 A1* | 8/2014 | Anderson | ............. | A01D 75/00 701/1 |
| 2014/0262547 A1* | 9/2014 | Acheson | ............. | G01F 13/003 177/1 |
| 2014/0331631 A1* | 11/2014 | Sauder | ............... | A01D 45/021 56/10.2 R |
| 2015/0242799 A1* | 8/2015 | Seki | ................. | A01B 79/005 705/7.15 |

OTHER PUBLICATIONS

White, An automatic yield data capture system, J. of Experimental Agriculture, 1976, pp. 373-375.*

T. S. Colvin et al., "Site-Specific Management Guidelines SSMG-9: Yield Monitor Accuracy", p. 1-4, Potash and Phosphate Institute, date unknown.

R. Taylor et al., "Using Yield Monitors to Assess On-Farm Test Plots", paper No. 1110690, presented at 2011 ASABE Annual International Meeting, Louisville, KY, Aug. 7, 2011.

ASABE Precision Agriculture Committee, "Yield Monitor Performance Test Standard", ASABE S578 Jan. 2007 (R2012), American Society of Agricultural and Biological Engineers, St. Joseph, MI, Jan. 2012.

* cited by examiner

US 10,373,353 B2

CROP YIELD DATA ADJUSTMENTS

TECHNICAL FIELD

The disclosure is related to crop yield monitoring and multi-harvester operations.

BACKGROUND

Modern farmers harvest wheat and other crops using multiple harvesters working together in one field. A common scenario is that the owner of the farm drives one harvester while a hired hand drives another. The owner, being highly motivated by the success or failure of his farm, tries hard to operate his machine properly and to understand and use all of its features. In particular, the owner understands how to calibrate his harvester's yield monitoring system to obtain accurate crop yield data. Farming is a data intensive business and knowing precisely how one's crops are performing is crucial to maximizing profit.

The hired hand is less likely to know or care as much as his boss about yield monitoring and other advanced harvester features. He may misunderstand, forget or even ignore instructions for running test strips before working a field, for example. He is more likely to harvest with a poorly calibrated yield monitor and accumulate inaccurate yield data.

Consider what happens when the owner and the hired hand harvest a field by taking alternate rows as shown in FIG. 1. The owner, in harvester A, works rows marked "A". Meanwhile, his help, in harvester B, works rows marked "B". After the day's work is done, the owner plots yield data on his computer using yield monitoring software and sees . . . stripes!

A stripe (i.e. a long narrow band or strip, typically of the same width throughout its length, differing in color from the surface or either side of it) pattern appears in the yield data because of inconsistent calibration between yield monitors on harvester A and B.

This is unsatisfactory to the owner. Although a stripe pattern could, in limited circumstances, be accurate (e.g. two varieties of a row crop planted in alternating rows), it is much more likely, especially with broadacre crops, to be the result of inconsistent yield monitor calibration. Stripes are an annoying distraction to say the least. They obscure the visual display of yield data that would otherwise show a farmer where his field may be in trouble from too little fertilizer, too much water, or other problems.

What are needed are systems and methods to fix the yield stripe problem.

DETAILED DESCRIPTION

Figure 1:
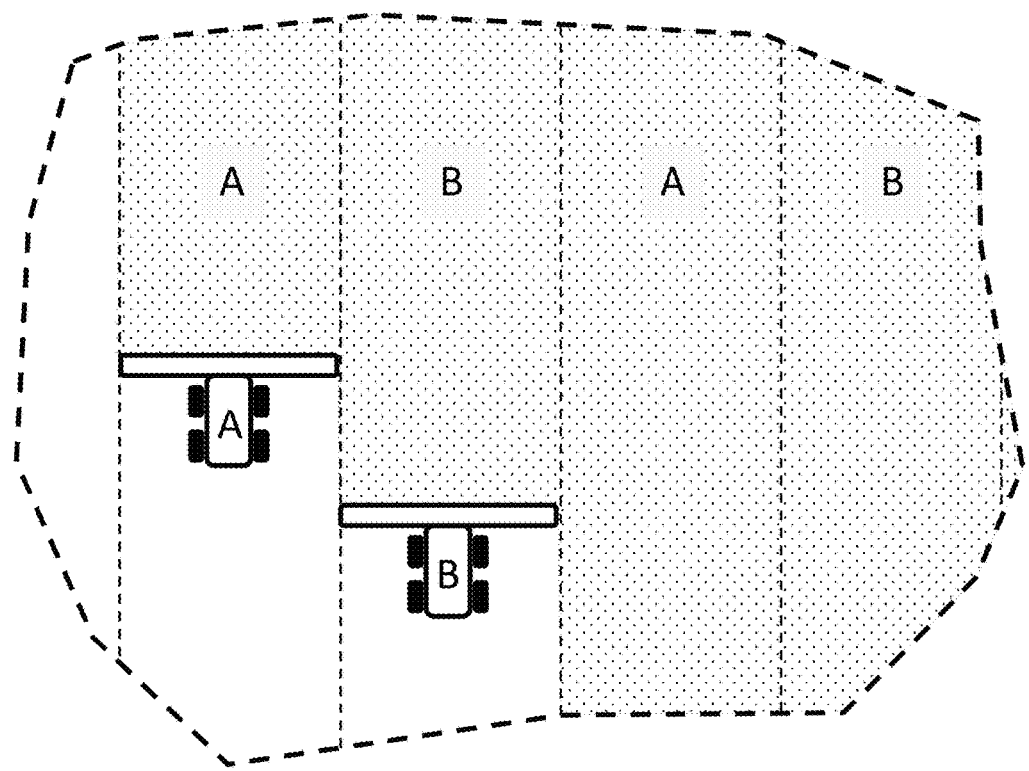
FIG. 1 is diagram showing two harvesters working adjacent rows in a field.

The yield stripe problem would be quickly solved if only the yield monitors on a fleet of harvesters were all properly calibrated. Experience shows, however, that this rarely happens. Therefore the systems and methods described below are designed to deal with yield data inconsistency and inaccuracy caused by inaccurate calibration.

Fortunately, poorly calibrated yield data is usually not random. Certain properties of the data (either known or assumed) can be exploited to make reasonable corrections. First, most yield monitors are capable of producing data with good relative accuracy even when the absolute accuracy is poor. For example, data may (accurately) show that yield is 5% worse in one part of a field while simultaneously overestimating the absolute yield by 20 bushels per acre. Second, it is reasonable to assume in many cases that the true yield varies slowly from row to row. Significant yield changes may only occur over distances greater than a few row widths. Third, it is often the case that yield data from one monitor is known to be more accurate than data from other monitors, as in the example of the farmer and his hired hand. Finally, more advanced methods for assessing the reliability of yield data may be applicable in some cases.

Crop yield data adjustment systems and methods described below are based on the idea that when two harvesters harvest adjacent swaths of a crop their yield monitors should report nearly the same yield. This assumes that the actual yield (crop weight per unit field area) is nearly the same for adjacent swaths. Of course, this assumption is not always true, but it is often accurate, especially for broadacre crops.

Data for crop yield maps are collected by mobile computer monitoring systems that correlate yield sensor data with harvester position data. A yield sensor may be based on an impact plate, or an optical sensor that measures crop volume in elevator buckets, as examples. Harvester position and speed are usually estimated with a global positioning system (GPS) or other global navigational satellite system (GNSS) receiver. The spatial resolution of yield data is limited by harvester width and by dispersion in the time it takes crops to get to a measuring point from different parts of a harvesting machine head. Position estimates, especially when using real-time-kinematic GPS, may be as accurate as one or two inches.

A computer monitoring system may be used to estimate locations where two harvesters harvested adjacent swaths. FIG. 2 shows a first example of a multi-harvester field coverage pattern. Tracks of two harvesters in field 205 are marked "A" and "B"; harvester A's track is shown as a solid line while harvester B's track is shown as a dashed line. In the example of FIG. 2, harvesters A and B alternate rows as in FIG. 1. In this case, all of the yield data from harvester A is obtained adjacent to data from harvester B and vice versa. FIG. 3 shows a second example of a multi-harvester field coverage pattern. In FIG. 3 tracks of two harvesters in field 305 are marked "A" and "B"; harvester A's track is shown as a solid line while harvester B's track is shown as a dashed line. In the example of FIG. 3, however, the only part of the field where the two harvesters harvest adjacent swaths is the center region bounded by heavy dashed rectangle 310. Thus FIGS. 2 and 3 illustrate extremes: nearly complete versus scarcely any areas of a field worked by different harvesters side-by-side.

Figure 2:
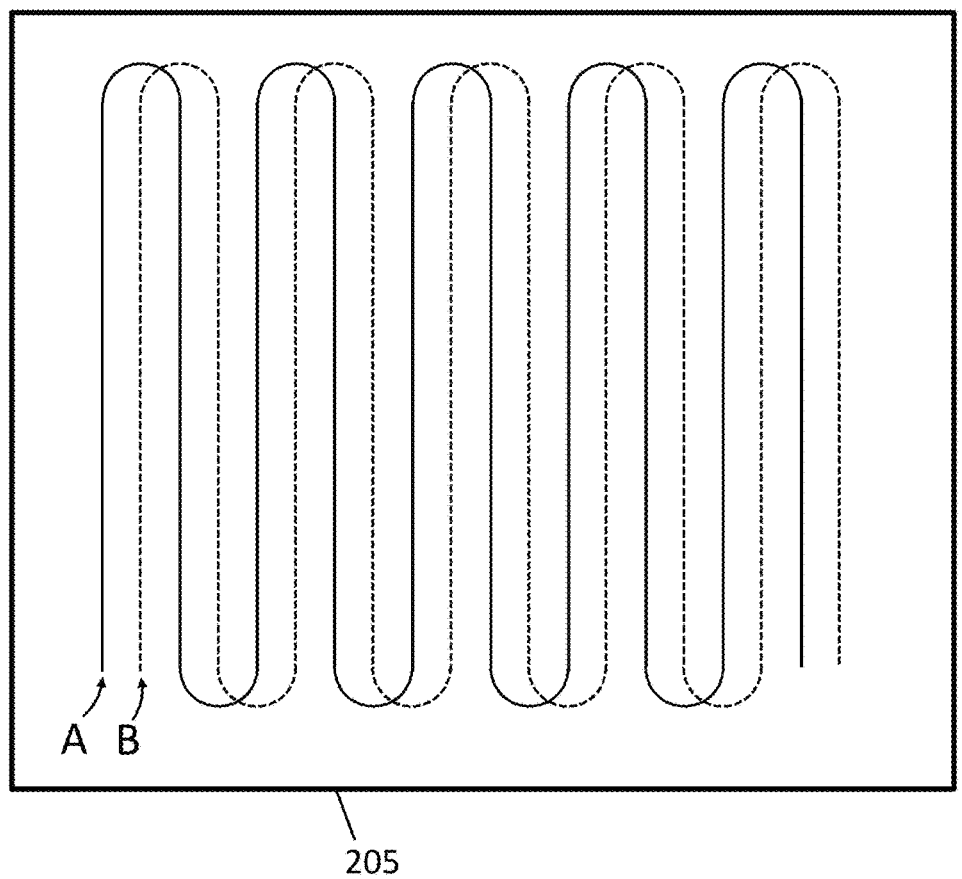
FIG. 2 shows a first example of a multi-harvester field coverage pattern.
Figure 3:
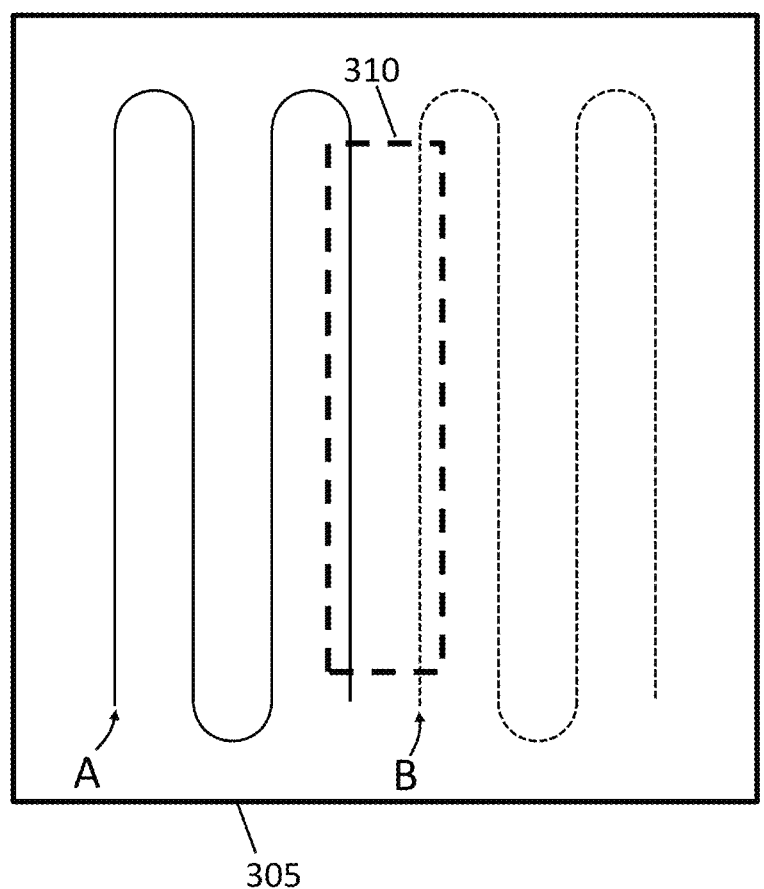
FIG. 3 shows a second example of a multi-harvester field coverage pattern.
Figure 4:
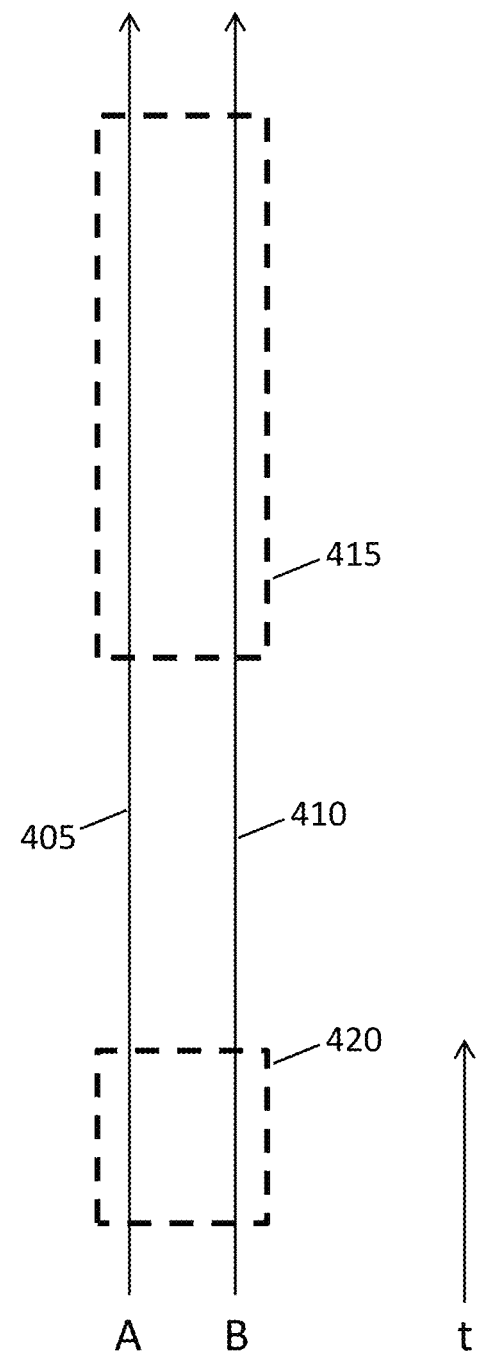
FIG. 4 illustrates multi-harvester field coverage concepts.

In general, field coverage by two or more harvesters may be more complicated than either the example of FIG. 2 or FIG. 3. Thus, FIG. 4 illustrates multi-harvester field coverage concepts in a more abstract way. In FIG. 4, line 405 represents the track of harvester A and line 410 represents the track of harvester B in time only. Heavy dashed rectangles 415 and 420 represent times that the two harvesters' tracks were adjacent to each other in a field. In other words, FIG. 4 may be thought of as a map in which each harvester's track has been straightened out into a line. This helps visualize the concept that some parts of a harvester's track are adjacent to tracks of other harvesters and some are not. The locations of adjacent harvesting such as 415 and 420 may be deduced using mapping software. Adjacent yield data may be used to establish calibration parameters that are then applied to non-adjacent data.

Figure 5A:
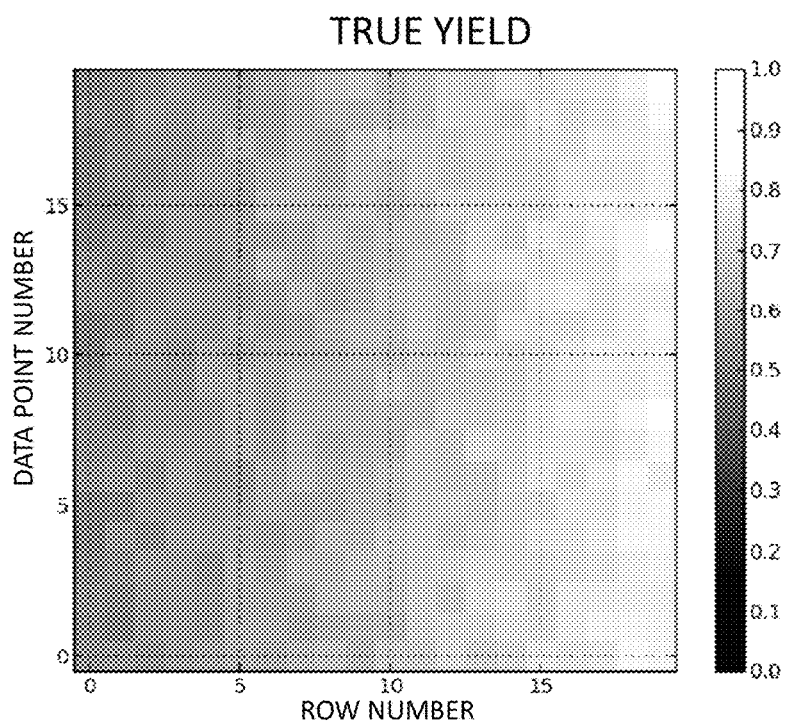
FIGS. 5A and 5B show true and measured yield, respectively, for a simulated field.
Figure 5B:
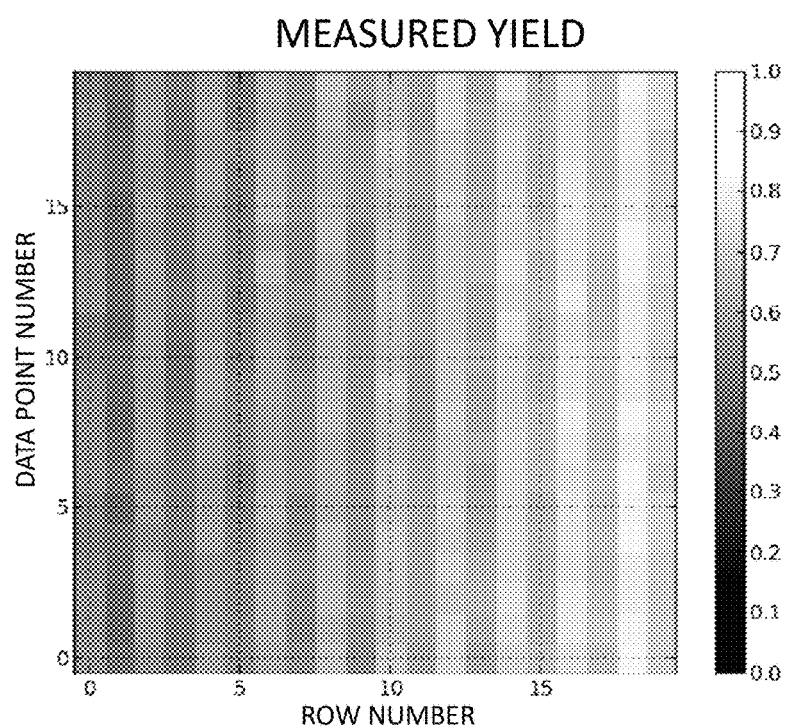

Returning now to the ABABAB . . . pattern of FIGS. 1 and 2, a yield monitoring simulation illustrates how yield stripes can be removed from yield data. FIGS. 5A and 5B show true and measured yield, respectively, for a simulated field. The simulated field has 16 rows and along each row yield data is obtained for 16 points. The scale bar to the right of the yield data shows the yield in normalized units from 0 (black) to 1 (white).

In the simulation the true yield, shown in FIG. 5A, varies linearly from roughly 0.6 on the left to roughly 0.8 on the right. Some random noise has been added to improve visualization. The simulation of measured yield, shown in FIG. 5B, assumes that the even numbered rows are measured by a perfectly calibrated yield monitor. The odd numbered rows, however, are measured by a yield monitor that measures 5% too low and has a 0.05 negative bias. In other words, if the true yield is X, then the yield monitor that works on the odd rows measures $0.95X - 0.05$.

Figure 6A:
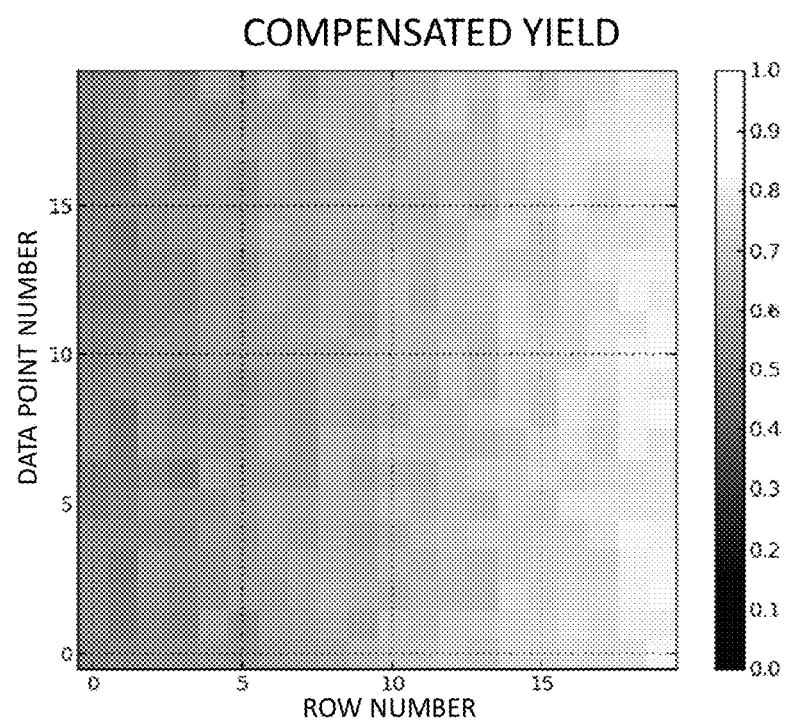
FIGS. 6A and 6B show compensated yield and yield error, respectively, for the simulated field.
Figure 6B:
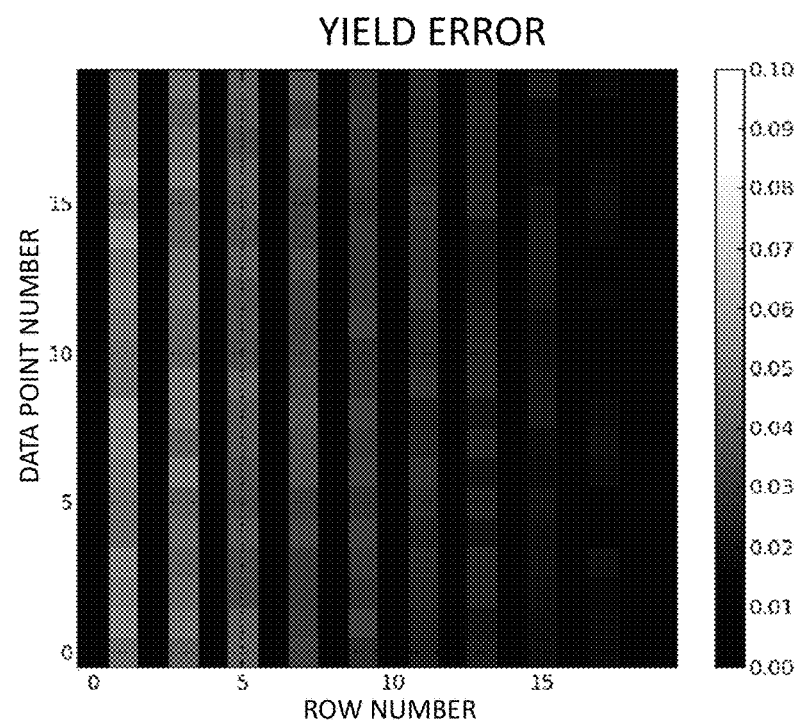

The measured yield of FIG. 5B exhibits inaccurate, and distracting, stripes. The stripes not only represent faulty data, but also make it harder to visualize trends in a field. The stripes are largely removed by a compensation technique. FIGS. 6A and 6B show compensated yield and yield error, respectively, for the simulated field.

FIG. 6A is obtained by adjusting the yield reported for the odd numbered rows by a dimensionless gain factor, $(1+\delta)$. In the example of FIG. 6A every point measured on an odd numbered row is adjacent to a point measured on an even numbered row. For example, points on row 7 are adjacent to points on row 6. Hence, in this example there is no need to identify which points measured by one harvester are adjacent to points measured by another harvester.

One procedure for obtaining a compensated yield plot as shown in FIG. 6A is the following: First, multiply the yield reported at each point on odd numbered rows by $(1+\delta)$. As an example, begin with $\delta=0.10$. Next, sum the squared differences between yields reported at adjacent points. For example, suppose the yield reported at the 9th data point on row 7 is 0.68 (normalized units) and the yield reported at the 9th data point on row 6 is 0.72. The squared difference between these yields is: $(0.68(1+0.1)-(0.72))^2=0.000784$. Squared differences for each data point on the field are summed to form an overall total. Next, the same procedure is repeated over the whole field for $\delta=0.09$. The procedure is repeated with different values of $\delta$ until an optimum $\delta=\delta_0$ is found that minimizes the sum of the squared differences over the whole field. Finally, all data points for odd rows are multiplied by $(1+\delta_0)$. The result is a compensated yield plot.

FIG. 6B shows the yield error in FIG. 6A. In other words, FIG. 6B is the difference between the compensated yield of FIG. 6A and the true yield of FIG. 5A. The even rows of FIG. 6B have no error by definition and are colored black. The odd rows show gradually decreasing error from left to right. This is because the fixed offset part of the error, −0.05, in the odd rows' yield is less significant when the absolute yield is greater, as it is on the right hand side of the field. Other methods, more sophisticated than applying a simple gain factor, could have been used to generate a compensated yield plot. However, there is little justification for added complexity unless more specific information on the error characteristics of the yield data is known.

Figure 7:
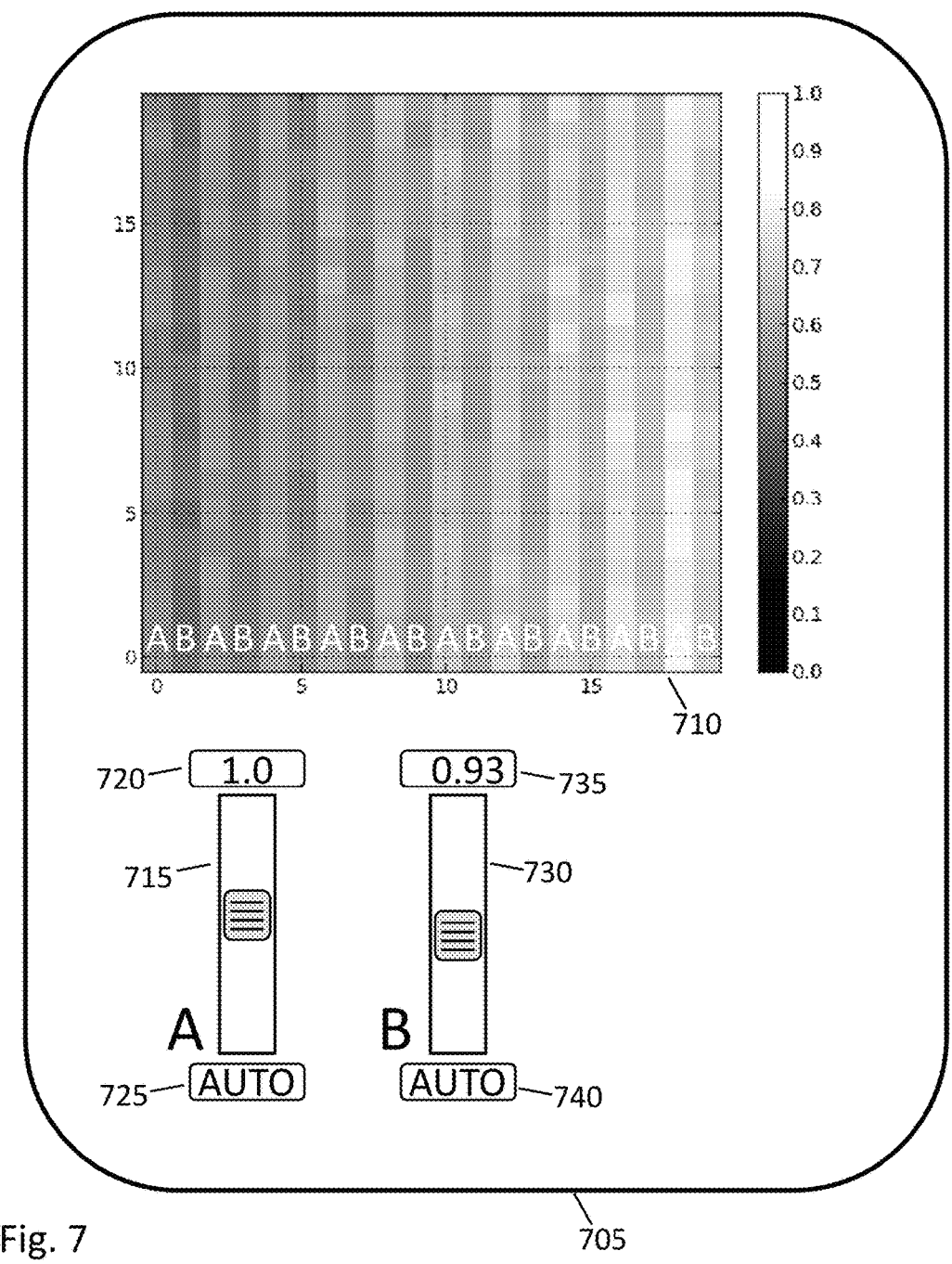
FIG. 7 shows an advanced yield monitor display.

Techniques for yield compensation discussed above may be incorporated into advanced yield monitor displays such as display 705 shown in FIG. 7. Display 705 may be part of a mobile computer mounted in a harvester (e.g. a specialized guidance display for precision farming applications) or it may be the display of a general purpose computer or mobile computing device.

Display 705 shows a map 710 of yield data. Data obtained from different harvesters may be labeled. In map 710, for example, rows harvested by one harvester are labeled 'A' while those harvested by another harvester are labeled 'B'. Display 705 also shows controls for each harvester's data. Slider 715, gain display 720 and AUTO button 725 are labeled 'A' to indicate that they apply to data from harvester 'A'; similarly, slider 730, gain display 735 and AUTO button 740 are labeled 'B' to indicate that they apply to data from harvester 'B'.

In a manual mode of operation, an operator may use sliders (e.g. 715, 730) to adjust a gain factor that multiplies yield data for a particular harvester. For example, in FIG. 7, slider 730 has been adjusted so that a gain of 0.93 is applied to yield data obtained from harvester 'B'. This means, for example, that wherever harvester B reported a yield of 0.68, the display shows the yield as $(0.68)(0.93)=0.632$. If the operator knows that harvester A's yield monitor is accurate and harvester B's yield monitor is uncalibrated, he may choose to make adjustments with B's slider (730) until the yield map looks good.

Alternatively, the operator may use B's AUTO button (740) to have software find an optimum gain factor according to a procedure such as that discussed in connection with FIGS. 5 and 6. When the button is pressed, the gain factor for harvester B is automatically adjusted to minimize the sum of the squared differences in yield between adjacent points measured by harvester A and B, for example.

In a different scenario an operator may have calibrated two or more harvesters' yield monitors by harvesting a test strip. (A test strip is an area of a field that has fairly uniform yield. After harvesting a test strip, the actual weight of crops harvested in the strip is measured. This provides an accurate calibration, but takes time to perform.) Data from test strip operations may be used to derive gain factors for each harvester and these may be set with sliders. Although FIG. 7 shows a two-harvester example, the display may be generalized to several harvesters.

Figure 8:
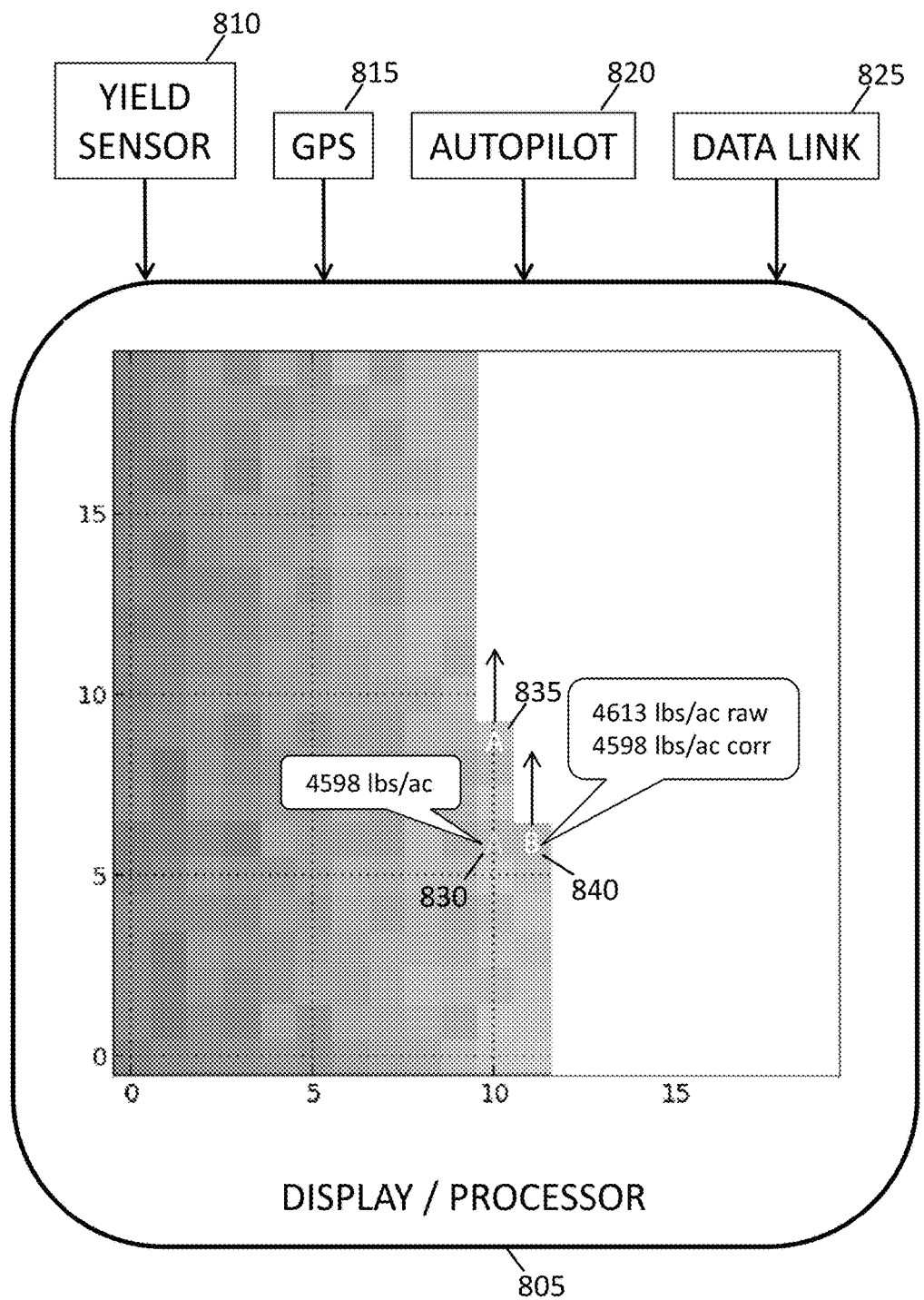
FIG. 8 shows an advanced yield monitor system.

Yield correction may also be performed as data is being collected with possible correction updates when a complete data set becomes available. FIG. 8 shows an advanced yield monitor system that offers real-time correction. The system of FIG. 8 includes display/processor 805, yield sensor 810, GPS 815, autopilot 820 and data link 825.

Display/processor 805 is a mobile computer and display unit that may include a touch screen and/or buttons for operator input. Yield sensor 810 senses mass flow of crops within a harvester. It may be based on an impact plate or optical measurements of crops in an elevator, as examples. GPS 815 is a global positioning system receiver that may also receive data from other GNSSs, augmentation systems, and reference stations. Autopilot 820 is optional for yield monitoring; however, systems that include GPS, autopilot and display/processor components are common. In that case yield monitoring may be an add-on feature of an autopilot system. Data link 825 may be a cellular radio, satellite radio or direct radio link to other mobile systems like that of FIG. 8, or to base stations.

In FIG. 8, display/processor 805 displays a yield map similar to that of FIG. 7. Display/processor 805, however, updates its map in real time as harvesting operations proceed. 'A' and 'B' show positions of two harvesters at various times. Assume for purposes of illustration that display/processor 805 is mounted in harvester 'A'. At position 830, harvester 'A' recorded a yield of 4598 lbs/acre. That was several seconds before the current situation in which harvester 'A' has moved to position 835 and harvester 'B' is at position 840.

Display/processor 805 knows the position (and position history) of harvester 'A' based on GPS, and the position (and position history) of harvester 'B' as reported by harvester 'B' via data link 825. Thus display/processor 805 can determine that when harvester 'B' is at position 840, it is adjacent to where harvester 'A' was when it was at position 830. At position 840, harvester 'B' reports a raw (i.e. uncorrected) yield of 4613 lbs/acre.

Display/processor 805 may plot the yield for position 840 in several different ways. First, the uncorrected yield (4613 lbs/acre) as reported by harvester 'B' may be displayed. Alternatively, if the yield monitor of harvester 'A' is known to be properly calibrated while that of harvester 'B' is not, the display may show the yield at position 840 as being equal to that at position 830, i.e. 4598 lbs/acre. (In that case, raw yield data from harvester 'B' is ignored for plotting purposes.) Alternatively, the display may show the yield at positions 830 and 840 to be the average of the respective reported yields, i.e. (4598+4613)/2=4605.5 lbs/acre. Alternatively, the display may apply the procedure described in connection with FIG. 6A using all adjacent data points available up to the present time.

There are clearly many different ways that display 805 may present yield data obtained from multiple harvesters. Further, a user may be presented with a choice of data display mode. A user may also be presented with an opportunity to choose manual or automatic adjustments as described in connection with FIG. 7.

Figure 9:
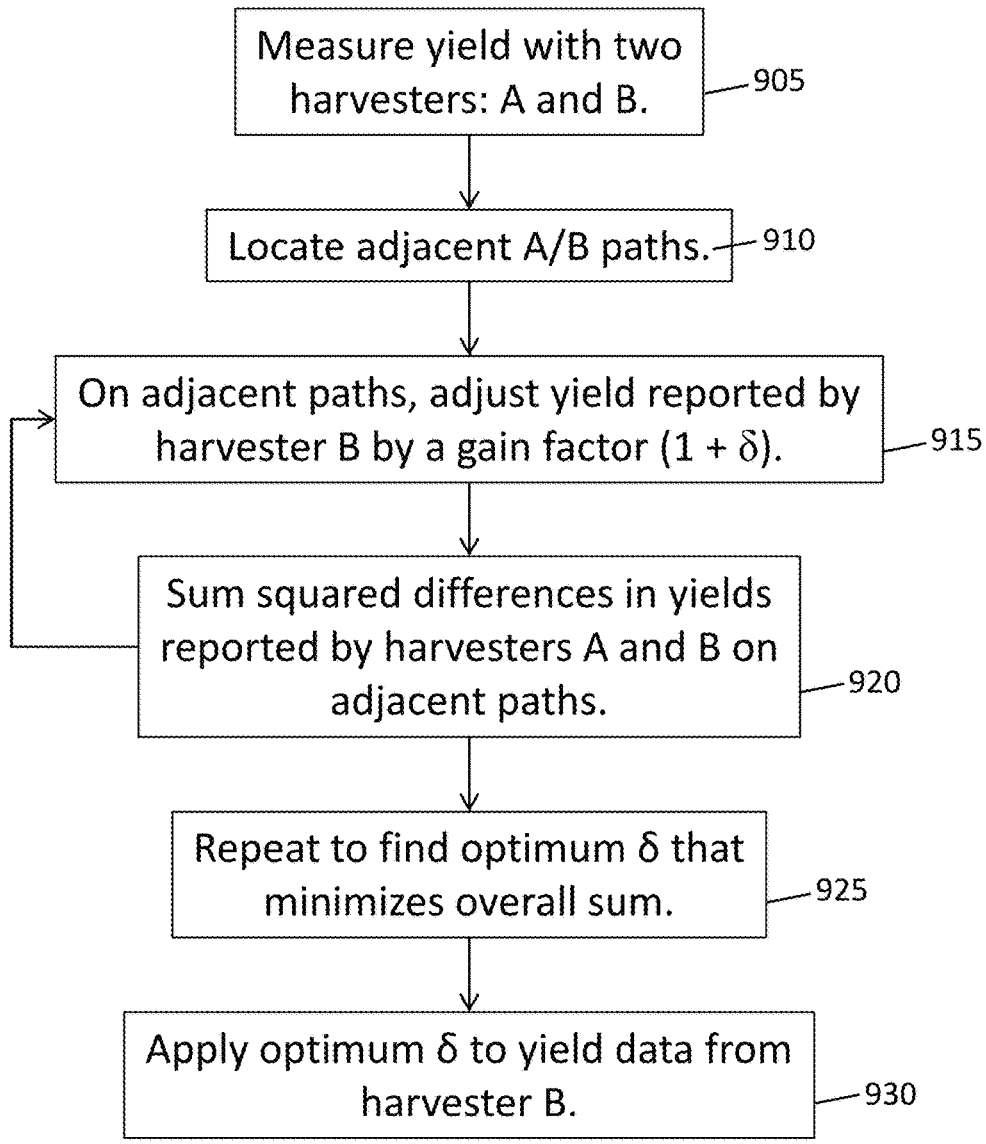
FIG. 9 is a flowchart for a first yield correction method.
Figure 10:
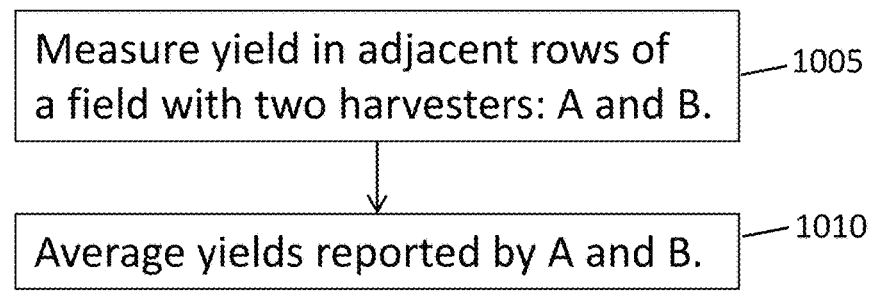
FIG. 10 is a flowchart for a second yield correction method.
Figure 11:
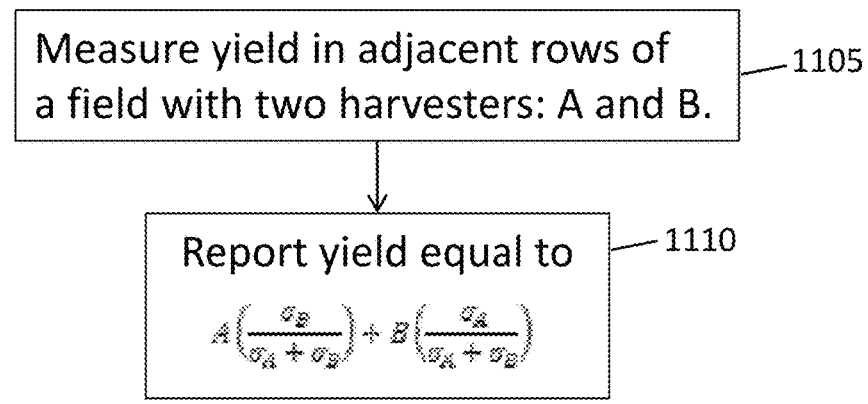
FIG. 11 is a flowchart for a third yield correction method.

FIGS. 9-11 summarize three yield correction methods. As noted above, other methods are possible and may be implemented in a display/processor like 805 in FIG. 8 or run on a general purpose computer. FIG. 9 is a flowchart for a first yield correction method. In FIG. 9, step 905 is measuring yield with two harvesters labeled 'A' and 'B'. Step 910 is finding adjacent A/B paths, i.e. finding where in a field harvesters A and B harvested adjacent rows. Step 915 is adjusting the yield reported by harvester B by gain factor (1+δ). For example, if harvester B reports a yield of 4613 lbs/acre at a certain location and δ=−0.065, then the adjusted yield at that location is 4613 (1−0.065)=4313 lbs/acre. Step 920 is forming a sum of squared differences in yield reported by harvesters A and B on adjacent paths. Yields reported on paths that are not adjacent to another harvester's path are not counted in this step. If harvester A reports a yield of 4592 lbs/acre at a location adjacent to where harvester B reports 4621 lbs/acre and δ=−0.051, then the squared difference for that location is $$[4592 - (4621(1 - 0.051))]^2 = 42712 \frac{\text{lbs}^2}{\text{acre}^2}.$$

Step 925 is repeating steps 915 and 920 for different values of δ until an optimum value is found that minimizes the sum of squared differences found in step 920. For example δ ranging from −0.1 to +0.1, corresponds to ±10% adjustment of yield values reported by harvester B. Finally step 930 is applying the optimum δ to yield data from harvester B, i.e. multiplying yield reported by harvester B by (1+δ). The optimum δ may be applied to all of harvester B's yield data, not just data obtained adjacent to harvester A.

FIG. 10 is a flowchart for a second yield correction method. The method of FIG. 10 is simple: Wherever harvesters A and B harvest adjacent swaths, average their results. One disadvantage of this method is that it only applies to adjacent swaths. In contrast, in the method of FIG. 9, data from adjacent swaths may be used to find an optimum δ that is applied to harvester B's reported yield everywhere in a field.

FIG. 11 is a flowchart for a third yield correction method that is based on the assumption that yield data accuracy is more accurate when its variance is lower. According to method of FIG. 11, yield is reported as $$A\left(\frac{\sigma_B}{\sigma_A + \sigma_B}\right) + B\left(\frac{\sigma_A}{\sigma_A + \sigma_B}\right)$$

for locations where harvesters A and B harvest adjacent swaths. This expression is a weighted average of the yields reported by harvesters A and B, where the weighting factors are functions of standard deviations of yield data. Consider, for example a case in which the standard deviation of yield data from harvester A is very small. In that case $$\left(\frac{\sigma_B}{\sigma_A + \sigma_B}\right) \cong 1, \left(\frac{\sigma_A}{\sigma_A + \sigma_B}\right) \cong 0,$$

and the reported yield is almost equal to the yield reported by harvester A. As in the case of the method of FIG. 10, the method of FIG. 11 only applies to adjacent swaths.

Harvesting with multiple harvesters in one field speeds up harvest but introduces the possibility of inconsistent yield data, often leading to yield stripes. Systems and methods described above adjust yield data to improve visual display and utility for agricultural decision making.

The above description of the disclosed embodiments is provided to enable any person skilled in the art to make or use the invention. Various modifications to these embodiments will be readily apparent to those skilled in the art, and the principles defined herein may be applied to other embodiments without departing from the scope of the disclosure. Thus, the disclosure is not intended to be limited to the embodiments shown herein but is to be accorded the widest scope consistent with the principles and novel features disclosed herein.

What is claimed is:

1. A system for generating crop yield maps with yield data from multiple harvesters to allow farmers to easily identify areas within a field of a broadacre crop that receive inapt amounts of at least one of fertilizer or water, comprising:
   a first global navigation satellite system (GNSS) receiver coupled to a first harvester, the first GNSS receiver configured to determine positions of the first harvester;
   a first yield sensor coupled to the first harvester, the first yield sensor configured to sense mass flow of a first portion of the broadacre crop harvested by the first harvester;
   a radio data link; and
   a display/processor in communication with the first GNSS receiver, the first yield sensor, and the radio data link, the display/processor configured to:
      receive in real time a plurality of first positions of the first harvester from the first GNSS receiver, the plurality of first positions corresponding to locations of the first harvester while the first harvester is in the field harvesting the broadacre crop;
      receive in real time first crop yield data from the first yield sensor, the first crop yield data obtained while the first harvester is in the field harvesting the broadacre crop;
      determine a first crop yield associated with each of the plurality of first positions of the first harvester using the first crop yield data;
      receive in real time, via the radio data link, a plurality of second positions of a second harvester from a second GNSS receiver coupled to the second harvester, the plurality of second positions corresponding to locations of the second harvester while the second harvester is in the field harvesting the broadacre crop;
      receive in real time, via the radio data link, second crop yield data from a second yield sensor coupled to the second harvester, the second crop yield data obtained while the second harvester is in the field harvesting the broadacre crop;
      determine a second crop yield associated with each of the plurality of second positions of the second harvester using the second crop yield data;
      identify one or more first paths of the first harvester in the field that are immediately adjacent to one or more second paths of the second harvester in the field using the plurality of first positions of the first harvester and the plurality of second positions of the second harvester;
      identify one or more first positions of the plurality of first positions that are obtained while the first harvester is moving along the one or more first paths;
      identify one or more second positions of the plurality of second positions that are obtained while the second harvester is moving along the one or more second paths;
      for each of the one or more first positions, identify a nearest one of the one or more second positions to create first position/second position pairs;
      identify the first crop yield and the second crop yield associated with each of the first position/second position pairs;
      determine a gain factor based on differences between the first crop yield and the second crop yield associated with each of the first position/second position pairs;
      adjust the second crop yield associated with each of the first position/second position pairs using the gain factor;
      display in real time, on a monitor display, the first crop yield and the adjusted second crop yield as a crop yield map using the plurality of first positions and the first crop yield and the plurality of second positions and the adjusted second crop yield; and
      use the crop yield map to identify one or more areas within the field that receive the inapt amounts of the at least one of fertilizer or water.

2. The system of claim 1, wherein the first yield sensor comprises an impact plate.

3. The system of claim 1, wherein the first yield sensor is configured to perform optical measurements of crop volume.

4. A method for generating crop yield maps with yield data from multiple harvesters to allow farmers to easily identify areas within a field of a broadacre crop that receive inapt amounts of at least one of fertilizer or water, the method comprising:
   receiving in real time a plurality of first positions of a first harvester from a first global navigation satellite system (GNSS) receiver coupled to the first harvester, the plurality of first positions corresponding to locations of the first harvester while the first harvester is in the field harvesting the broadacre crop;
   receiving in real time first crop yield data from a first yield sensor coupled to the first harvester, the first yield sensor configured to sense mass flow of a first portion of the broadacre crop harvested by the first harvester, the first crop yield data obtained by the first harvester while the first harvester is in the field harvesting the broadacre crop;
   determining a first crop yield associated with each of the plurality of first positions of the first harvester using the first crop yield data;
   receiving in real time, via a radio data link, a plurality of second positions of a second harvester from a second GNSS receiver coupled to the second harvester, the plurality of second positions corresponding to locations of the second harvester while the second harvester is in the field harvesting the broadacre crop;
   receiving in real time, via the radio data link, second crop yield data from a second yield sensor coupled to the second harvester, the second yield sensor configured to sense mass flow of a second portion of the broadacre crop harvested by the second harvester, the second crop yield data obtained by the second harvester while the second harvester is in the field harvesting the broadacre crop;
   determining a second crop yield associated with each of the plurality of second positions of the second harvester using the second crop yield data;
   identifying one or more first paths of the first harvester in the field that are immediately adjacent to one or more second paths of the second harvester in the field using the plurality of first positions of the first harvester and the plurality of second positions of the second harvester;
   identifying one or more first positions of the plurality of first positions that are obtained while the first harvester is moving along the one or more first paths;
   identifying one or more second positions of the plurality of second positions that are obtained while the second harvester is moving along the one or more second paths;

for each of the one or more first positions, identifying a nearest one of the one or more second positions to create first position/second position pairs;

identifying the first crop yield and the second crop yield associated with each of the first position/second position pairs;

determining a gain factor based on differences between the first crop yield and the second crop yield associated with each of the first position/second position pairs;

adjusting the second crop yield associated with each of the first position/second position pairs using the gain factor;

displaying in real time, on a monitor display, the first crop yield and the adjusted second crop yield as a crop yield map using the plurality of first positions and the first crop yield and the plurality of second positions and the adjusted second crop yield; and using the crop yield map to identify one or more areas within the field that receive the inapt amounts of the at least one of fertilizer or water.

* * * * *